May 12, 1959 — J. DIVIZIA — 2,885,943
VENTILATING APPARATUS
Filed Nov. 19, 1956

INVENTOR.
JOSEPH DIVIZIA
BY
Walter J. Jason
ATTORNEY

United States Patent Office 2,885,943
Patented May 12, 1959

2,885,943

VENTILATING APPARATUS

Joseph Divizia, San Marino, Calif., assignor to General Dynamics Corporation, San Diego, Calif., a corporation of Delaware Application November 19, 1956, Serial No. 622,899

14 Claims. (Cl. 98—40)

This invention relates to ventilating apparatus and more particularly to a ventilating valve device for controllably admitting air therethrough.

An object of the present invention is to provide a ventilator valve of improved construction which is readily adjustable for control of the volume of air admitted through it and which is adapted to be adjustably mounted to control the angle at which air is directed into an area of use, which area may be in an aircraft, bus, or other form of transporting vehicle.

Another object of this invention is to provide a ventilator valve of the above character wherein the noise produced by the flow of air is minimal.

A further object of this invention is to provide an improved form of ventilator device which is characterized by its simplicity, ease of manufacture, economy and efficiency in operation.

Other objects and features of the present invention will be readily apparent to those skilled in the art from the following specification and appended drawings wherein is illustrated a preferred form of the invention, and in which.

Figure 1:
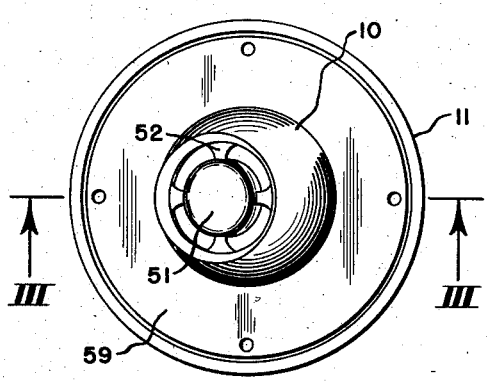
Figure 1 is a plan view of the present ventilating valve device mounted in an attaching member.
Figure 2:
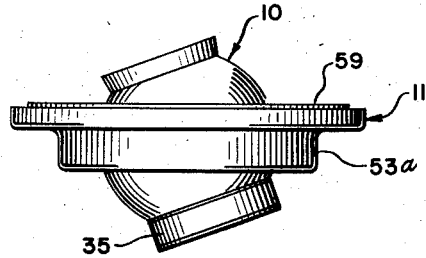
Figure 2 is a side elevational view thereof.

Having reference now with particularity to the drawings the ventilating valve device of the present invention is indicated therein generally by the numeral 10. Associated with valve device 10 is a mounting assembly 11 which supports valve device 10 for universal movement to control the direction of the flow of air into the vehicle compartment which is to be serviced.

Valve device 10 comprises a housing or valve body 12 which is formed of a portion 13 having substantially the form of a sphere from which extends an integral substantially truncated cone shaped or flared portion 14. A passage 15 extends longitudinally through housing 12 from one end to the other, with chamfer 15a afforded at the inlet 16 to passage 15 and an inwardly directed flange 17 formed at the outlet thereof. Positioned within passage 15 of housing 12 and completely encased therewithin is a cylindrical valve closure member 18, adapted for rotative and rectilinear movement, having a bore 19 therethrough and being provided with an inwardly directed annular flange or shoulder 21 at the inlet end of such bore 19, shoulder 21 being rounded or chamfered as shown at 22. Formed on the interior cylindrical wall surfaces of closure member 18 are a pair of diametrically opposed integral projections 23 which extend from the bottom edge 24 of closure member 18 for a short distance longitudinally along these wall surfaces for a purpose to be described. Formed in the exterior wall surfaces of cylindrical closure member 18 on opposite sides of such member are a pair of spiral grooves or channels 25 and 26, each of which is angularly disposed with respect to the longitudinal axis of closure member 18 and each of which extends in an inclined path substantially 180° about the closure member, the opposite terminal ends of one groove being vertically spaced from the opposite terminal ends of the other. Grooves 25 and 26 assist in the rotative and rectilinear movements of closure member 18 as will be described.

Figure 6:
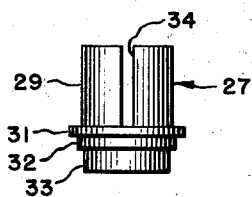
Figure 6 is an elevational view of the actuator member of the present invention.
Figure 5:
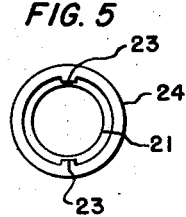
Figure 5 is a bottom view of the valve closure of Figure 4.

Coaxially disposed within bore 19 of valve closure member 18 is a tubular actuator member 27 having a bore 28. Member 27, as best shown in Figure 6, includes an upper cylindrical portion 29, an outwardly projecting peripheral flange 31, an annular surface 32, and a lower cylindrical portion 33 which is thinner walled than upper cylindrical portion 29. A pair of diametrically opposed slots 34 are formed in upper cylindrical portion 29 and extend from the upper edge thereof to terminate at flange 31. Slots 34 are adapted to receive interior projections 23 of closure member 18 whereby rotative movement of actuator member 27 will effect rotative movement of closure member 18 as will be more fully discussed hereinafter.

Disposed about the lower end of lower cylindrical portion 31 of actuator 27 is a collar member 35 which is secured in place by a pair of set screws 36. Screws 36 pass through internally threaded holes provided in collar 35 and project into aligned openings formed in the end of lower cylindrical member 33 which projects below housing 12. Collar 35 is grooved about its periphery as at 37 to receive a ring 38 of a suitable flexible material such as rubber which serves a decorative purpose in concealing the heads of screws 36 and also provides a non-slip surface which assists the user in grasping and manipulating the present device.

Cylindrical valve closure member 18, as above stated, is totally contained within passage 15 of housing 12 when in its assembled condition. To maintain closure member 18 in operative condition within passage 15 there is provided a pair of dog point set screws 41 and 42 threadably received within a pair of threaded openings 43 formed in spherical portion 13 of housing 12 in aligned opposition. Set screws 41 and 42 cooperate respectively with spiral grooves 25 and 26 into which their dog point portions 44 are adapted to project. With set screws 41 and 42 adjusted to a position where their dog point portions 44 project into grooves 25 and 26 it is apparent that closure member 18 cannot be removed from passage 15.

To prevent possible air leakage between closure member 18 and the wall of passage 15 there is provided a usual O-ring 45 of resilient material which is disposed in an annular groove 46 formed in the wall of passage 15 and lies in surrounding relationship to closure member 18 at its upper end.

Figure 3:
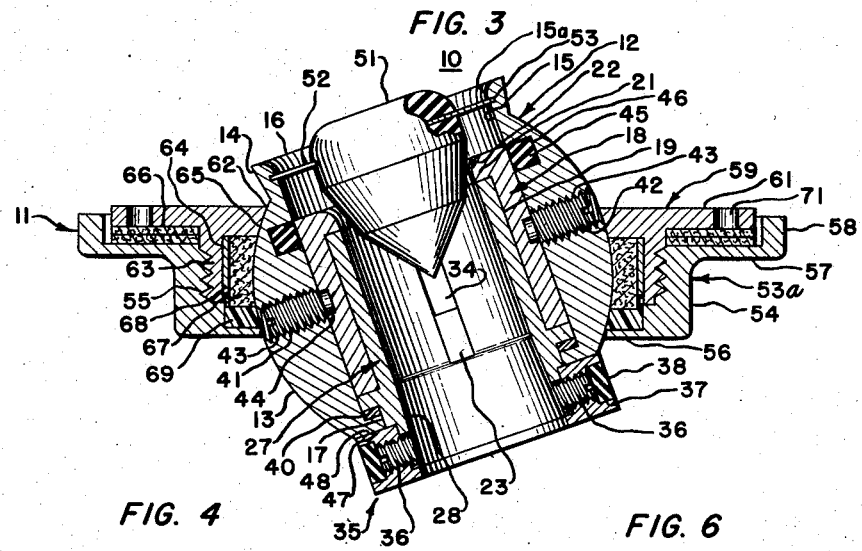
Figure 3 is an enlarged sectional view taken along the line III—III of Figure 1.
Figure 4:
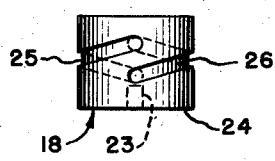
Figure 4 is an elevational view of the valve closure element of the present invention.

Actuator member 27 which fits into bore 19 of closure member 18 is movable rotatively relative to housing 12 but is restrained against rectilinear movement relative thereto, the restriction against rectilinear movement being accomplished by the cooperation of flange 31 of actuator member 27, flange 17 of housing 12 and collar 35. As shown in Figure 3 peripheral flange 31 of actuator member 27 lies in opposition to inwardly directed flange 17 of housing 12 at the interior side thereof; with flange 17 disposed in the path of flange 31 obviously there can be no withdrawal of actuator member 27 from passage 15 through its outlet. Interposed between flanges 31 and 17 to serve as a thrust bearing is a usual sealing ring 40 against which the lower surface of flange 31 rests. Sealing ring 40 may suitably be formed of a stable synthetic plastic such as polymerized tetrafluoroethylene which is commercially available under the name Teflon. To prevent inward rectilinear movement of actuator member 27, actuator member 27 carries the collar 35, hereinabove described. As is apparent from the drawings, collar 35 lies at the exterior side of flange 17 and has its upper surface 47 positioned opposed to flat annular exterior surface 48 at the lower end of spherical body portion 13. Accordingly, it is clear that with collar 35 in place actuator member 27 cannot be moved rectilinearly inwardly of passage 15.

However, though actuator member 27 is restrained against rectilinear movement it can be made to rotate within passage 15 by manual grasping collar 35 and turning it, such frictional forces as may be present at various contacting surfaces being readily overcome by the manual force applied.

Rotation of actuator member 27 will result in concomitant rotative movement of closure member 18 by reason of the interconnection therebetween effected by the disposal of the interior projections 23 of closure member 18 within longitudinal slots 34 of actuator member 27. Slots 34, as has been described, are open at one of their ends whereby when actuator member 27 and closure member 18 are assembled projections 23 will enter slots 34 through these open ends to provide the desired interconnection.

Closure member 18 in addition to being rotatively movable within passage 15 will at the same time be longitudinally or rectilinearly movable therewithin, such longitudinal movement being the consequence of the projection of dog point portions 44 of set screws 41 and 42 within spiral grooves 25 and 26 formed on the exterior surface of closure member 18. It is apparent that the force applied to closure member 18 to effect its rotation will cause spiral grooves 25 and 26 to ride upon points 44 of the set screws 41 and 42 resulting in the desired longitudinal movement of closure member 18. In the longitudinal movement of closure member 18 projections 23 thereof which connect it to actuator member 27 ride freely along the length of slots 34.

The amount of angular rotation of closure member 18 and actuator member 27 and the extent of rectilinear movement of closure member 18 is predetermined by the arcuate disposition and extent of spiral grooves 25 and 26. Since in the present embodiment spiral grooves 25 and 26 are disposed substantially 180° about the closure member 18, this member and actuator member 27 are restricted to a rotation of substantially 180°. Points 44 of set screws 41 and 42 will engage the end walls of the grooves to determine the amount of longitudinal movement had by closure member 18. The lengths of spiral grooves 25 and 26 are so selected that closure member 18 can be moved into desired positions relative to a conical plug member 51 to control the flow and the amount of air through the present device.

Conical plug member 51, as shown in the drawings, is positioned within the inlet 16 of housing 12 and has its vertex directed in the direction of the longitudinal axis of such housing. Closure member 18 is adapted, upon rotation of actuator member 27 in one direction, to be rectilinearly moved into engagement with the side walls of conical plug 51 to completely close the inlet to the passage therethrough and prevent any flow of air through the present valve device 10. Rotation of actuator member 27 in the opposite direction will cause closure member 18 to move rectilinearly away from conical plug 51 to afford an annular opening between it and the chamfered inlet 21 through which air may flow. The greater the distance that closure member 18 is spaced from conical plug 51 the greater the amount of air which may flow through valve device 10. Thus it is within the power of the operator to control the amount of air which may be passed.

To mount conical plug 51 in desired relationship to closure member 18 there is provided a plurality of generally triangular shaped brace elements 52 made of flexible metal. The apices of these brace elements 52 are carried within the conical plug 51 while their base portions are received within an annular groove 53 formed in the interior wall of passage 15 of housing 12.

Conical plug 51 may be made of any suitable pliant elastomeric material such as natural or synthetic rubber. The use of material of this nature permits the forcible insertion of the apices of brace elements 52 into plug 51, to be retained therewithin by the resiliency of the material. Since the brace elements 52 themselves are formed of a flexible metal they will flex sufficiently in the assembling of plug 51 within housing 12 to permit movement of the plug into position and the bases thereof will snap into place within annular groove 53, thereby locating and maintaining the plug in its desired position. Use of the means of mounting, as described, results in a flexible support for plug 51 to assure proper centering of the plug within actuator element 18 and thereby assure a positive air-tight seal between the plug 51 and closure member 18.

Conical plug 51 acts as a directional means which efficiently guides air into the chamfered annular inlet of closure member 18. By virtue of its shape and location relative to the passages through closure member 18 and actuator member 27 conical plug 51 causes air to flow smoothly and uniformly through such passages to issue into the area of use with little if any turbulence. Affording a smooth flow to the air and avoiding turbulence serves to substantially eliminate any noise of flow of air through the present device.

Locating conical plug 51 relative to closure member 18 in the manner described will effect a Venturi passage so that air passing through the Venturi throat is afforded a greater velocity allowing it to be directed more effectively to the area of use.

Housing 12, closure member 18, actuator member 27 and collar 35 of the present valve device are conveniently formed of aluminum by reason of its lightness of weight and durability, though, of course it is understood, the particular material employed forms no part of the present invention, and, accordingly, any suitable material may be employed such as magnesium, steel, or plastic.

The present ventilator device 10 is adapted to be conveniently located in a vehicle so that it can be readily manipulated by a passenger to direct air to the area occupied by him. To mount ventilator device 10 for convenient operation there is provided the mounting assembly 11 which will also support ventilator device 10 in air receiving position relative to the usual air duct on trough present in the vehicle.

Mounting assembly 11 comprises an annular socket member 53a which includes an internally threaded well portion 54 with a central opening 55 and an inwardly directed annular flange 56 encircling such opening. The wall of the opening through flange 56 has a spherical or arcuate contour conforming to the contour of spherical valve body portion 13. Projecting outwardly from the upper end of well 54 is an annular peripheral flange 57 at the edge of which and normal thereto is provided an encircling flange 58. Cooperating with socket member 53a is a retaining member 59 consisting of an annular plate 61 with a central opening 62 therethrough, and having an exteriorly threaded cylindrical portion 63 projecting downwardly from its lower surface in surrounding relation to the central opening 62 but spaced therefrom to provide a shoulder 64. The defining wall 65 of opening 62 is of spherical or arcuate contour to conform to spherical valve body portion 13. Retaining member 59 is adapted to be fitted to socket member 53a with its exteriorly threaded portion 63 screwing into interiorly threaded well 54 of the socket member. In this assembly usual gasket rings 66 are fitted between the under surface of annular plate 61 of retaining member 59 and the upper surface of peripheral flange 57 of socket 53a. Additional air sealing means are also afforded, one of which is a ring 67 of a suitable material such as felt which is disposed within cylindrical portion 63 of retaining member 59 and which is spring pressed into sealing relationship with valve device 10 by a usual clip member 68 of resilient metal. Positioned below felt ring 67 and upon the upper surface of inwardly directed flange 56 of socket 53 is a ring 69 made of a suitable material which may be a synthetic plastic such as polymerized tetrafluoroethylene (Teflon). The defining wall of the opening through ring 69 is provided with a spherical contour conforming to that of spherical body portion 13.

Retaining member 59 is afforded a plurality of mounting holes 71 adapted to receive rivets or other suitable fasteners (not shown) for securing the retaining member to the air supply duct of the vehicle.

With retaining member 59 in secured position the valve device 10 and socket 53a are brought to it in the assembly operation. In this operation valve device 10 is first inserted into opening 62 of socket 53 and the socket 53a is then lifted to the retaining member 59 and screwed into position thereon. As stated above, the defining walls of central opening 55 of socket 53a and of opening 62 of retaining member 59 and of sealing ring 69 are afforded an arcuate or spherical contour conforming to the contour of spherical body portion 13 of valve device 10. These arcuate wall portions provide a seat for body portion 13 whereby valve device 10 is mounted for universal movement to permit directional control of the air stream.

In the operation of the present ventilator unit 10 a passenger will grasp the lower end of the device at collar 35 and swing unit 10 on its seat to that position which will direct a flow of air into that portion of the passenger area he desires to be cooled. Rotation of collar 35 in one direction will, as described, move actuator member 27 to rectilinearly move closure member 18 away from plug 51 to effect a flow of air through the ventilator unit 10, while rotation in the opposite direction will move closure member 18 into engagement with plug 51 to close off air flow. The amount of air flowing into the passenger area is, of course, determined by the amount of rectilinear movement provided closure member 18, since the greater the annular opening afforded about plug 51 the more the air that is admitted. Sealing ring 45 which encircles closure member 18 affords a frictional force which acts upon member 18 to retain it in adjusted position and prevent an inadvertent change of setting due to vibration.

In its operation the present ventilator device 10 with its chamfered inlet 16 to flared portion 14, its chamfered inlet 22 to closure member 18 and its conical plug 51 effects a smooth flow of air to the area of use with a minimum of noise and consequent discomfort to the passenger.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A ventilating valve device comprising a housing having a passage therethrough, means supported by said housing for controlling the flow of air through said housing, said means comprising a rectilinearly movable cylindrical member having a through bore, said cylindrical member being positioned for movement within said housing passage and having exterior wall surfaces in sliding engagement with the interior wall surfaces of said housing passage, a plug element mounted within said housing passage in the path of movement of said cylindrical member in position to be engaged by one end of said cylindrical member to close the inlet opening of the bore thereof to prevent the passage of air, an actuator member rotatively connected to said housing, and connection means between said cylindrical member and said actuator member for providing rectilinear movement of said cylindrical member to carry said one end thereof into and out of engagement with said plug element upon rotative movement of said actuator member.

2. A ventilating valve device comprising a housing having a passageway therethrough, a cylindrical member having a through bore movably positioned in said passageway with its exterior wall surfaces in sliding engagement with the defining wall surfaces of said passageway, a plug member mounted within said passageway in the path of movement of said cylindrical member for engagement by an end of said cylindrical member, means mounting said cylindrical member for simultaneous rotative and rectilinear movement within said passageway, an actuator member rotatively connected to said housing, and connection means connecting said actuator member with said cylindrical member for producing rotative and rectilinear movement of said cylindrical member to carry said end thereof toward and away from engagement with said plug member to close and open the inlet opening of the bore thereof to control the flow of air through said housing.

3. A ventilating valve device comprising a housing having a bore extending therethrough for the passage of air, a generally conical shaped air directing member mounted within said bore, a cylindrical closure member having a through bore and being movably positioned within said housing bore coaxially relative to said air directing member, the exterior wall surfaces of said cylindrical closure member being slidably engageable with the interior wall surfaces of said housing bore, means mounting said cylindrical member for simultaneous rotative and rectilinear movement within said passageway, a tubular actuator member extending into the exit opening of the bore of said cylindrical closure member with its exterior wall surfaces in slidable engagement with the interior wall surfaces of said cylindrical member, means for rotatively mounting said actuator member on said housing, means for slidably interconnecting said cylindrical closure member and said actuator member whereby rotative movement of said actuator member produces simultaneous rotative and rectilinear movement of said cylindrical closure member to carry the inlet end thereof toward and away from engagement with said conical shaped air directing member to close and open the inlet opening of the bore of said closure member to control the flow of air through said housing.

4. A ventilating valve device comprising a housing having a bore extending therethrough for the passage of air, a generally conical shaped air directing member mounted within said bore, a cylindrical closure member having a through bore and being movably positioned within said housing bore coaxially relative to said air directing member, the exterior wall surfaces of said cylindrical closure member being slidably engageable with the interior wall surfaces of said housing bore, means mounting said cylindrical member for simultaneous rotative and rectilinear movement within said passageway, a tubular actuator member extending into the exit opening of the bore of said cylindrical closure member with its exterior wall surfaces in slidable engagement with the interior wall surfaces of said cylindrical member, means for rotatively mounting said actuator member on said housing, said actuator member having slots formed therein, said closure member having projecting portions receivable within said slots and slidable therealong for connecting said closure member with said actuator member whereby rotative movement of said actuator member produces simultaneous rotative and rectilinear movement of said cylindrical closure member to carry the inlet end thereof toward and away from engagement with said conical shaped air directing member to close and open the inlet opening of the bore of said closure member to control the flow of air through said housing.

5. A ventilating valve device comprising a housing having a passage therethrough, a plug element mounted within said housing passage adjacent the inlet end thereof, a cylindrical closure member having a through bore and being movably positioned within said passageway coaxially relative to said plug element, the exterior wall surfaces of said cylindrical closure member being slidably engageable with the interior wall surfaces of said housing passage, means mounting said cylindrical closure member for simultaneous rotative and rectilinear movement, said means comprising holding means carried by said housing having projecting portions, and trackways formed in the exterior wall surfaces of said cylindrical closure member, said trackways being angularly disposed with respect to the longitudinal axis of said cylindrical closure member and which receive said projecting portions, a rotatively mounted actuator member, and means providing an operative connection between said actuator member and said cylindrical closure member whereby rotation of said actuator member produces rotative and rectilinear movement of said cylindrical member to carry its inlet end toward and away from engagement with said plug member to close and open the inlet opening of the bore thereof to control the flow of air through said housing.

6. A ventilating valve device comprising a housing having a passage therethrough, a plug element mounted within said housing passage, a cylindrical closure member having a through bore and being movably positioned within said passageway coaxially relative to said plug element, the exterior wall surfaces of said cylindrical closure member being slidably engageable with the interior wall surfaces of said housing passage, means mounting said cylindrical closure member for simultaneous rotative and rectilinear movement, said means comprising holding means carried by said housing having projecting portions, and trackways formed in the exterior wall surfaces of said cylindrical closure member, said trackways being angularly disposed with respect to the longitudinal axis of said cylindrical closure member and which receive said projecting portions, a tubular actuator member extending into said cylindrical closure member with its exterior wall surfaces in slidable engagement with the interior wall surfaces of said cylindrical member, and means for rotatively mounting said actuator member on said housing, said actuator member having slots formed in its walls, said closure member having projecting portions on its interior wall surfaces receivable within said slots and slidable therealong for connecting said closure member with said actuator member whereby rotative movement of said actuator produces rotative and rectilinear movement of said cylindrical member to carry its inlet end toward and away from engagement with said plug member to close and open the inlet opening of the bore thereof to control the flow of air through said housing.

7. A ventilating valve device comprising a housing having a bore extending therethrough for the passage of air, a generally conical shaped air directing member mounted within said bore adjacent the inlet thereof, a cylindrical closure member having a through bore and being movably positioned within said housing bore coaxially relative to said air directing member to receive the vertex portion of said air directing member, the exterior wall surfaces of said cylindrical closure member being slidably engageable with the interior wall surfaces of said housing bore, means mounting said cylindrical closure member for simultaneous rotative and rectilinear movement, said means comprising holding means carried by said housing having projecting portions, and trackways formed in the exterior wall surfaces of said cylindrical closure member and which receive said projecting portions, said trackways being angularly disposed with respect to the longitudinal axis of said cylindrical closure member, an actuator member, means mounting said actuator member for rotative movement on said housing, and means for slidably interconnecting said cylindrical closure member and said actuator member whereby rotative movement of said actuator member produces simultaneous rotative and rectilinear movement of said cylindrical closure member to carry its inlet end toward and away from engagement with said conical shaped air directing member to close and open the inlet opening to the bore of said closure member to control the flow of air through said housing.

8. A ventilating valve device comprising a housing having a bore extending therethrough for the passage of air, a generally conical shaped air directing member mounted within said bore adjacent the inlet thereof, a cylindrical closure member having a through bore and being movably positioned within said housing bore coaxially relative to said air directing member to receive the vertex portion of said air directing member, the exterior wall surfaces of said cylindrical closure member being slidably engageable with the interior wall surfaces of said housing bore, means mounting said cylindrical closure member for simultaneous rotative and rectilinear movement, said means comprising holding means carried by said housing having projecting portions, and trackways formed in the exterior wall surfaces of said cylindrical closure member, said trackways being angularly disposed with respect to the longitudinal axis of said cylindrical closure member and which receive said projecting portions, and a tubular actuator member extending into said cylindrical closure member with its exterior wall surfaces in slidable engagement with the interior wall surfaces of said cylindrical closure member, means for rotatively mounting said actuator member on said housing, said actuator member having longitudinally extending slots formed therein, and projecting portions on said closure member receivable within said slots and slidable therealong for connecting said closure member with said actuator member whereby rotative movement of said actuator member produces simultaneous rotative and rectilinear movement of said cylindrical closure member to carry its inlet end toward and away from engagement with said conical shaped air directing member to close and open the inlet opening to the bore of said closure member to control the flow of air through said housing.

9. A ventilating valve device comprising a housing having a bore extending therethrough for the passage of air, said housing having a substantially spherical portion, a mounting member for said housing having an opening therethrough with generally arcuate surfaces forming a spherical seat conforming to the contour of said housing spherical portion for rotatably supporting said housing, a cylindrical member having a through bore and being adjustably positionable within said housing bore, the exterior wall surfaces of said cylindrical member being slidably engageable with the interior wall surfaces of said housing bore, a generally conical shaped air directing member, flexible support means for mounting said air directing member coaxially relative to said cylindrical member with the vertex portion thereof extending into the bore of said cylindrical member, means mounting said cylindrical member for simultaneous rotative and rectilinear movement, sealing means carried by said housing in encircling relationship to said cylindrical member to seal between the cylindrical member and the wall of said housing bore and to yieldably maintain said cylindrical member against inadvertent movement from an adjusted position, an actuator member rotatively connected to said housing, and connection means interconnecting said actuator member and said cylindrical member for producing simultaneous rotative and rectilinear movement of said cylindrical member to carry its inlet end toward and away from engagement with said conical shaped air directing member to close and variably open an annular passage about said air directing member whereby the flow of air through said housing is controlled when said actuator member is rotated.

10. A ventilating valve device comprising a housing having a bore extending therethrough for the passage of air, said housing having a substantially spherical portion, a mounting member for said housing having an opening therethrough with generally arcuate surfaces forming a spherical seat conforming to the contour of said housing spherical portion for rotatably supporting said housing, a cylindrical member having a through bore and being adjustably positionable within said housing bore, the exterior wall surfaces of said cylindrical member being slidably engageable with the interior wall surfaces of said housing bore, a generally conical shaped air directing member, flexible support means for mounting said air directing member coaxially relative to said cylindrical member with the vertex portion thereof extending into the bore of said cylindrical member, means mounting said cylindrical member for simultaneous rotative and rectilinear movement, said means comprising holding means carried by said housing transverse to the longitudinal axis of said cylindrical member, said holding means having projecting portions, and grooves formed in the exterior walls of said cylindrical member, said grooves being angularly disposed with respect to the longitudinal axis of said cylindrical member and which receive said projecting portions, sealing means carried by said housing in encircling relationship to said cylindrical member to seal between the cylindrical member and the wall of said housing bore and to yieldably maintain said cylindrical member against inadvertent movement from an adjusted position, an actuator member rotatively mounted on said housing and means operatively interconnecting said actuator member and said cylindrical member whereby rotative movement of said actuator member produces simultaneous rotative and rectilinear movement of said cylindrical member to carry its inlet end toward and away from engagement with said conical shaped air directing member to close and variably open an annular passage about said air directing member to control the flow of air through said housing.

11. A ventilating valve device comprising a housing having a bore extending therethrough for the passage of air, said housing having a substantially spherical portion, a mounting member for said housing having an opening therethrough with generally arcuate surfaces forming a spherical seat conforming to the contour of said housing spherical portion for rotatably supporting said housing, a cylindrical member having a through bore and being adjustably positionable within said housing bore, a generally conical shaped air directing member, flexible support means for mounting said air directing member coaxially relative to said cylindrical member with the vertex portion thereof extending into the bore of said cylindrical member, means mounting said cylindrical member for simultaneous rotative and rectilinear movement, said means comprising holding means carried by said housing transverse to the longitudinal axis of said cylindrical member, said holding means having projecting portions receivable within grooves formed in the exterior walls of said cylindrical member, said grooves being angularly disposed with respect to the longitudinal axis of said cylindrical member, sealing means carried by said housing in encircling relationship to said cylindrical member to seal between the cylindrical member and the wall of said housing bore and to yieldably maintain said cylindrical member against inadvertent movement from an adjusted position, a tubular actuator member extending into said cylindrical closure member, means for rotatively mounting said actuator member on said housing, said actuator member having longitudinally extending slots formed therein, and projecting portions on said cylindrical member receivable within said slots and slidable therealong for connecting said cylindrical member with said actuator member whereby rotative movement of said actuator member produces simultaneous rotative and rectilinear movement of said cylindrical member toward and away from engagement with said conical shaped air directing member to close and variably open an annular passage about said air directing member to control the flow of air through said housing.

12. A ventilating valve device comprising a housing having a passage therethrough, a plug element mounted within said housing passage adjacent its inlet, a cylindrical closure member having a through bore and being movably positioned within said passageway coaxially relative to said plug element, the exterior wall surfaces of said cylindrical closure member being slidably engageable with the interior wall surfaces of said housing passage, means mounting said cylindrical closure member for simultaneous rotative and rectilinear movement, said means comprising a pair of opposed holding means carried by said housing transverse to the longitudinal axis of said cylindrical closure member, said pair of holding means each having a projecting portion, and one of a pair of spiral grooves formed in the exterior walls of said cylindrical closure member, said pair of spiral grooves each extending in an inclined path for substantially 180° on opposite sides of said cylindrical closure member and each receiving one of said projecting portions, a rotatively mounted actuator member on said housing, and means operatively interconnecting said actuator means and said cylindrical closure member for producing rotative movement of said cylindrical member whereby the inlet end of said cylindrical member will be moved toward or away from engagement with said plug member to close and open the inlet opening of the bore thereof to control the flow of air through said housing.

13. A ventilating valve device comprising a housing having a bore extending therethrough for the passage of air, said housing having a substantially spherical portion, a mounting member for said housing having an opening therethrough with generally arcuate surfaces forming a spherical seat conforming to the contour of said housing spherical portion for rotatably supporting said housing, a cylindrical member having a through bore and being adjustably positionable within said housing bore, the exterior wall surfaces of said cylindrical member being slidably engageable with the interior wall surfaces of said housing bore, a generally conical shaped air directing member, flexible support means for mounting said air directing member coaxially relative to said cylindrical member with the vertex portion thereof extending into the bore of said cylindrical member, means mounting said cylindrical member for simultaneous rotative and rectilinear movement, sealing means carried by said housing in encircling relationship to said cylindrical member to seal between the cylindrical member and the wall of said housing bore and to yieldably maintain said cylindrical member against inadvertent movement from an adjusted position, a tubular actuator member fitting within the bore of said cylindrical member and extending to the exterior of said housing with its exterior wall surfaces in slidable engagement with the interior wall surfaces of said cylindrical member, means for mounting and restricting said actuator member to rotative movement, said means comprising a collar member carried on the portion of said actuator member extending to the exterior of said housing, said actuator member having slots formed therein, and projecting portions on said cylindrical member receivable within said slots and slidable therealong for connecting said cylindrical member with said actuator member whereby rotative movement of said actuator member produces simultaneous rotative and rectilinear movement of said cylindrical member to carry its inlet end toward and away from engagement with said conical shaped air directing member to close and variably open an annular passage about said air directing member to control the flow of air through said housing.

14. A ventilating valve device comprising a housing having a passage therethrough, said housing embodying a substantially spherical portion, a mounting member for said housing, said mounting member having surfaces of spherical contour forming a seat for said spherical portion for rotatably supporting the same, means supported by said housing for controlling the flow of air through said housing, said means comprising a rectilinearly movable cylindrical member having a through bore, said cylindrical member being positioned within said housing passage, the exterior wall surfaces of said cylindrical member being slidably engageable with the interior wall surfaces of said housing passage, a plug element mounted within said housing passage in position to be engaged by said cylindrical member to close the inlet opening of the bore thereof to prevent the passage of air, means mounting said cylindrical member for simultaneous rotative and rectilinear movement, an actuator member rotatively connected to said housing, and means operatively connecting said cylindrical member and said actuator member whereby rotative movement of the actuator member will effect rectilinear movement of said cylindrical member into and out of engagement with said plug element.

References Cited in the file of this patent

UNITED STATES PATENTS

| | | |
|---|---|---|
| 2,516,805 | Rother et al. | July 25, 1950 |
| 2,596,909 | Mufich et al. | May 13, 1952 |
| 2,672,806 | Vehige | Mar. 23, 1954 |